No. 715,894. Patented Dec. 16, 1902.
S. N. & F. W. STONE.
EYEGLASS MOUNTING.
(Application filed Feb. 11, 1902.)
(No Model.)
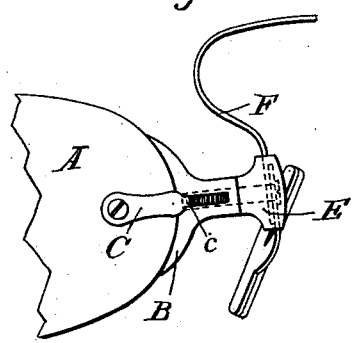
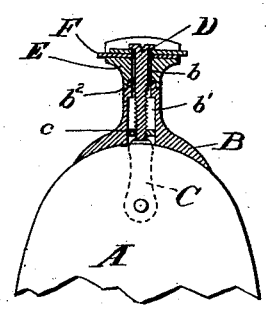 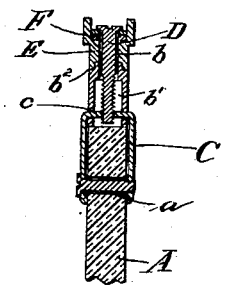
Witnesses
R. H. Storm,
William B. Thomas
Samuel N. Stone, Inventors
Frederic W. Stone.
By Edwin Guthrie
Attorney

UNITED STATES PATENT OFFICE.

SAMUEL N. STONE AND FREDDERIC W. STONE, OF ATTLEBORO, MASSACHUSETTS.

EYEGLASS-MOUNTING.

SPECIFICATION forming part of Letters Patent No. 715,894, dated December 16, 1902.

Application filed February 11, 1902. Serial No. 93,582. (No model.)

*To all whom it may concern:*

Be it known that we, SAMUEL N. STONE and FREDDERIC W. STONE, citizens of the United States, residing at Attleboro, in the county of Bristol and State of Massachusetts, have invented certain new and useful Improvements in Eyeglass-Mountings; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to eyeglass-mountings, and has for its object the production of new and improved means for attaching lenses to the nose-guards of eyeglasses or spectacles without the use of a frame or rim encircling the lenses and capable of effecting certain adjustments in accordance with the following statement.

Manufacturers of eyeglass and spectacle frames receive from lens-makers glasses of any size or curvature ordered. Those lenses which are to be secured to the nose-guards directly without the use of the inclosing frame are provided with a hole through the glass near one end, and a prong-shaped clamp or holder straddles the end of the lens and has its ends clamped against the lens-surface by means of a screw passing through the legs of the clamping-prong and through the hole in the glass. In connection with the prong there is customarily a crescent-shaped block which bears against the edge of the lens and holds the mounting and lens in their proper relative positions. In practice the distance from the edge of the hole drilled through the end portion of the lens for the screw mentioned varies somewhat in a number of lenses, and it is often difficult to cause the crescent to bear firmly upon the edge of the lens and to clamp the entire mounting rigidly together without bending the crescent or altering the position of the hole and risking breaking the lens.

Our invention has for its special object the construction of a screw-clamp mounting in which the crescent or edge block and the prong-clamp may be drawn toward or from each other, thereby pressing the crescent against the edge of the lens securely in every article, although there may be some variation of the distance between the hole and edge, as stated.

Each constituent element of our invention is described in detail and its individual office, together with the mode of operation of the whole, fully explained hereinbelow.

We accomplish the object set forth by employing the certain particular devices, of which Figure 1 of the accompanying drawings represents a side view of the preferred form, showing a portion of a lens and nose-guard connected by our invention. Fig. 2 is a vertical mid-sectional view taken upon a plane parallel with the lens, and Fig. 3 is a mid-sectional view taken upon a horizontal plane at right angles with the plane of the second figure.

Like letters are used to refer to like parts throughout the several views, and in order that the parts may be clearly illustrated they are drawn somewhat larger than ordinarily manufactured.

Considering the drawings, letter A designates the lens, and $a$ the hole drilled through it. (See Fig. 3.)

Letter B marks the crescent or edge block of the usual form and having a recess $b$ extending from the middle of the bow of the crescent into its shank, as shown.

The prong-clamp is referred to by the letter C, and that portion or base of the piece where the legs are joined is lettered $c$. This base of the prong is wider and thicker in the middle than it is where it passes through the recesses $b$, and the interior of the crescent has a hollow chamber $b'$, fashioned to receive the prong-base $c$. (See Fig. 2.) The reason for widening and thickening of the base of the prong-clamp is to afford sufficient strength of material to permit the formation of a screw-hole through the base, which is engaged by the clamping-screw D.

In Figs. 2 and 3 it will be noted that the crescent is formed with a shoulder $b^2$ at the top and that the channel-block E is constructed to fit the top of the shouldered portion of the crescent. In the channel of block E the nose-guard spring F is situated, and the clamping-screw D passes through all the parts, as shown, and it will now be understood that any variation of the distance of the hole $a$ through the lens from the edge of the lens may be overcome by causing the prong-clamp C to project farther without or by withdrawing it into the recesses of the crescent block.

We do not limit our construction to the particular forms of the elements shown and described herein, but may modify those elements in different articles.

So far as we are aware no eyeglass-mounting has been constructed employing screw clamping means for adjusting the parts with regard to the distance of the hole through the lens from the edge of the lens, and the only means for accomplishing this object hitherto made public consists of a prong-clamp having legs sinuous in form, whereby the legs may be drawn out longer or compressed into shorter length, as desired.

What we claim, and seek to secure by Letters Patent of the United States, is—

1. In an eyeglass-mounting, the combination of a prong-shaped lens-clamp, and a screw passing through the ends of the legs of the prong and through the lens whereby the lens is secured to the said clamp, an edge block having a transverse recess, the base of the said lens-clamp being constructed to pass into the said recess of the edge block without binding, and a screw passing axially through the edge block and engaging the base of the lens-clamp by which the clamp may be drawn into the said recess and the edge block caused to press against the edge of the lens, substantially as described.

2. In an eyeglass-mounting, the combination of a prong-shaped lens-clamp, and a screw passing through the ends of the legs of the prong and through the lens whereby the lens is secured to the said clamp, an edge block having a shoulder at the top and a transverse recess, the base of the said lens-clamp being constructed to pass into the said recess of the edge block without binding, a channel-block formed to fit the shoulder of the edge block, and a screw passing axially through the channel-block and edge block and engaging the base of the lens-clamp by which the clamp may be drawn into the said recess and the edge block caused to press against the edge of the lens, substantially as described.

In testimony whereof we affix our signatures in presence of two witnesses.

SAMUEL N. STONE.
FREDDERIC W. STONE.

Witnesses:
  EDWARD J. BOWEN,
  EDITH BOWEN.